US007965699B1

(12) United States Patent
Accardi et al.

(10) Patent No.: US 7,965,699 B1
(45) Date of Patent: Jun. 21, 2011

(54) ROUTING/SWITCHING ON A HETEROGENEOUS NETWORK

(75) Inventors: Anthony Accardi, Cambridge, MA (US); Greg Scallan, Hampton, NJ (US); John Bandhauer, Aptos, CA (US); Eryk Warren, Montreal (CA)

(73) Assignee: TellMe Networks, Inc., Mountain View, CA (US)

( * ) Notice: Subject to any disclaimer, the term of this patent is extended or adjusted under 35 U.S.C. 154(b) by 274 days.

(21) Appl. No.: 11/468,134

(22) Filed: Aug. 29, 2006

(51) Int. Cl.
H04L 12/28 (2006.01)
(52) U.S. Cl. ............... 370/351; 379/265.01; 379/265.02
(58) Field of Classification Search .......... 370/351–360, 370/389, 464–465; 379/900, 265.01, 265.02, 379/265.11–266.08; 709/227, 228; 455/445
See application file for complete search history.

(56) References Cited

U.S. PATENT DOCUMENTS

| | | | | |
|---|---|---|---|---|
| 5,452,294 | A * | 9/1995 | Natarajan | 370/351 |
| 6,334,056 | B1 * | 12/2001 | Holmes et al. | 455/445 |
| 6,377,808 | B1 * | 4/2002 | Korneluk et al. | 455/445 |
| 6,760,775 | B1 * | 7/2004 | Anerousis et al. | 709/238 |
| 6,847,631 | B1 * | 1/2005 | Lawser et al. | 370/352 |
| 7,188,163 | B2 * | 3/2007 | Srinivasan et al. | 709/221 |
| 2002/0112073 | A1 * | 8/2002 | MeLampy et al. | 709/240 |
| 2002/0114278 | A1 * | 8/2002 | Coussement | 370/235 |
| 2004/0249948 | A1 * | 12/2004 | Sethi et al. | 709/227 |
| 2005/0063403 | A1 * | 3/2005 | Binder | 370/412 |
| 2006/0069570 | A1 * | 3/2006 | Allison et al. | 704/270 |
| 2006/0133300 | A1 * | 6/2006 | Lee et al. | 370/254 |

OTHER PUBLICATIONS

Anerousis, N.; Hjalmtysson, G., "Service level routing on the Internet," Global Telecommunications Conference, 1999. Globecom '99 , vol. 1B, No., pp. 553-559 vol.1b, 1999.*
Hucaby, D. and McQuerry, S., Cisco Field Manual: Router Configuration. Cisco Press, Indianapolis, IN, 2002.*
CramSession. Route Redistribution—Get different routing protocols to pass routing information to each other. Feb. 10, 2005. <http://web.archive.org/web/20050210152348/http://www.brainbuzz.com/articles/get-article.asp?aid=21>.*
M. Lottor; "Domain Administrators Operations Guide"; Network Working Group; Request for Comments: 1033; Nov. 1987; 14 pages.
P. Mockapetris; "Domain Names—Concepts and Facilities"; Network Working Group; Request for Comments: 1034; Nov. 1987; 49 pages.
P. Mockapetris; "Domain Names—Implementation and Specification"; Network Working Group; Request for Comments: 1035; Nov. 1987; 49 pages.

(Continued)

*Primary Examiner* — William Trost, IV
*Assistant Examiner* — Ashil Farahmand
(74) *Attorney, Agent, or Firm* — Perkins Coie LLP

(57) ABSTRACT

A call routing system includes a first set of routers and a second set of routers. The first routers and the second routers implement a same routing scheme based on dynamic distribution parameters. One of the first routers is configured to receive a call and make a first routing decision regarding the call based on the routing scheme and a first set of the dynamic distribution parameters. One of the second routers is configured to make a second routing decision regarding the call based on the routing scheme and a second set of the dynamic distribution parameters.

21 Claims, 11 Drawing Sheets

OTHER PUBLICATIONS

J. Rosenberg et al.; "SIP: Session Initiation Protocol"; Network Working Group; Request for Comments: 3261; Jun. 2002; 76 pages.

J. Rosenberg et al.; Reliability of Provisional Responses in Session Initiation Protocol (SIP); Network Working Group; Request for Comments: 3262; Jun. 2002; 10 pages.

J. Rosenberg et al.; "Session Initiation Protocol (SIP): Locating SIP Servers"; Network Working Group; Request for Comments: 3263; Jun. 2002; 16 pages.

Charlotte Wolter; "Softswitch Defined Precise Features and Target Markets Still Fuzzy, But Softswitch is Starting to Come Into Focus"; www.xchandemag.com; May 2000; 4 pages.

"What is a Softswitch?"; www.MobileIN.com; Dec. 4, 2006 (print date); 3 pages.

* cited by examiner

```
<rsxml>  (root element)
    <tg> --- term group allows for the grouping of terminations
        <term> --- is a reference to a specific termination <app> --- defines an application
        <ruleref> --- is a reference to a rule for use by an application
        <rule> --- defines how calls are to be routed to one or more
                terminations
            <ruleref> --- is a reference to a rule for use by another rule
            <termref> --- is a termination reference for a rule
            <tgref> --- is a reference to a termination group for a rule
            <prop> --- contains properties that are to be applied to routing a
                    call
                <health> --- how to treat a termination whose health
                        score has fallen below a threshold
                <retry> --- number of attempts for establishing a
                connection
                <dist> --- load balancing across rules, term groups and
                        terminations
                <confine> --- present a call should to a specific
                        termination
                <error> --- errors that may occur
```

FIG. 9

CR: CALL ROUTER (GSLB(S) AND/OR SCD(S))
A: SITE ADMINISTRATION

ROUTING/SWITCHING ON A HETEROGENEOUS NETWORK

BACKGROUND

1. Field of the Invention

Implementations described herein relate generally to routing calls in a shared network to a destination and, more specifically, to routing calls based on a desired application associated with a destination.

2. Description of Related Art

Techniques exist for setting up a telephone call between two users using the Session Initiation Protocol (SIP). SIP is a client-server protocol used for the initiation and management of communications sessions between users. The SIP, as discussed in RFC 3263, uses domain name system (DNS) procedures to allow a client to locate a SIP server and a backup SIP server if the primary server has failed so that call setup can be established.

A typical SIP configuration is a SIP "trapezoid," where a caller in a first domain wants to call a second caller in a second domain. In order to setup the call, the caller in the first domain contacts a first proxy (client) in the first domain. The first proxy forwards the request to a second proxy (server) in the second domain and the second proxy in the second domain contacts the user in the second domain to complete the call setup.

As part of the call setup interaction, the first proxy (client) from the first domain needs to determine the proxy (server) in the second domain. The first proxy accomplishes this by making a DNS request using DNS procedures including both service (SRV) and naming authority pointer (NAPTR) records.

The DNS response provides a listing of available proxies (servers) along with their transport protocol, IP address and port. The first proxy selects from the list a proxy in the second domain that has a compatible transport protocol and sends the call request to the second proxy. If the second proxy fails to respond, the first proxy accesses the list and locates another proxy in the second domain that operates a compatible transport protocol. The first proxy may then send the request to the second proxy for routing the call. This protocol allows for call setup between two users in two separate domains.

Although SIP allows for call setup between two users, SIP does not provide mechanisms for the routing of telephone calls to a destination in a shared network where the destination is associated with an application that is requested by the party making the call. SIP also does not account for load balancing of destinations based on dynamic parameters about the health and available capacity of destinations and other network components in a shared network. Further, SIP does not provide a mechanism for distribution of a common routing scheme shared by call routers within the shared network ensuring that the mechanisms by which the call is routed are atomic in nature and predicable in behavior.

SUMMARY

According to one aspect, a call routing system may include a first set of routers and a second set of routers. The first routers and the second routers may implement a same routing scheme based on dynamic distribution parameters. One of the first routers may be configured to receive a call and select, based on the routing scheme and a first set of the dynamic distribution parameters, a group of the second routers to potentially process the call. One of the second routers in the group of second routers may be configured to select, based on the routing scheme and a second set of the dynamic distribution parameters, a termination to process the call.

According to another aspect, a method for call routing in a system that includes a first set of routers and a second set of routers is provided. The method may include storing a same routing scheme on the first routers and the second routers; receiving a call at one of the first routers; selecting, by the one first router, a group of the second routers to potentially process the call based on the routing scheme and a first set of dynamic distribution parameters; selecting, by one of the second routers in the group of second routers, a termination to process the call based on the routing scheme and a second set of the dynamic distribution parameters; and routing the call to the termination.

According to yet another aspect, a call routing system may include a first set of routers and a second set of routers. The first routers and the second routers may store both a first routing scheme and a second routing scheme. One of the first routers may be configured to receive a call, and determine an active routing scheme of the first routing scheme and the second routing scheme, and select, based on the active routing scheme, a group of the second routers to potentially process the call. One of the second routers in the group of second routers may be configured to select, based on the active routing scheme, a termination to process the call.

According to a further aspect, a call router may include means for storing both a first routing scheme and a second routing scheme; means for receiving a call; means for determining that the first routing scheme is an active routing scheme for the call; and means for routing the call based on the first routing scheme even when another routing scheme becomes the active routing scheme during routing of the call.

According to another aspect, a method for call routing in a system that includes a first set of routers and a second set of routers is provided. The method may include storing a same routing scheme on the first routers and the second routers; receiving a call by one of the first routers; making, by the one first router, a first routing decision for the call based on the routing scheme and a first set of dynamic distribution parameters; making, by one of the second routers, a second routing decision for the call based on the routing scheme and a second set of the dynamic distribution parameters; and routing the call based on the first and second routing decisions.

According to yet another aspect, a call routing system may include a first set of routers and a second set of routers. The first routers and the second routers may implement a same routing scheme based on dynamic distribution parameters. One of the first routers may be configured to receive a call and make a first routing decision regarding the call based on the routing scheme and a first set of the dynamic distribution parameters. One of the second routers may be configured to make a second routing decision regarding the call based on the routing scheme and a second set of the dynamic distribution parameters.

According to a further aspect, a call routing system may include a first set of routers and a second set of routers. The first routers and the second routers may store both a first routing scheme and a second routing scheme. One of the first routers may be configured to receive a call, determine an active routing scheme of the first routing scheme and the second routing scheme, and make a first routing decision regarding the call based on the active routing scheme. One of the second routers may be configured to make a second routing decision regarding the call based on the active routing scheme.

BRIEF DESCRIPTION OF THE DRAWINGS

The foregoing features of the invention will be more readily understood by reference to the following detailed description, taken with reference to the accompanying drawings, in which:

FIG. 9 shows a routing scheme data structure that may be used in one embodiment of the invention;

DETAILED DESCRIPTION

The following detailed description of the invention refers to the accompanying drawings. The same reference numbers in different drawings may identify the same or similar elements. Also, the following detailed description does not limit the invention.

In illustrative embodiments of the invention, a virtual switching architecture routes telephone calls between a client and a termination of a shared network. The termination provides voice-over-Internet protocol (VOIP)-related applications to the requesting client. The shared network includes several physically distinct locations called data centers and logically distinct entities including virtual switch network components that form a logically distinct entity that need not be located at the same physical location.

Figure 1:
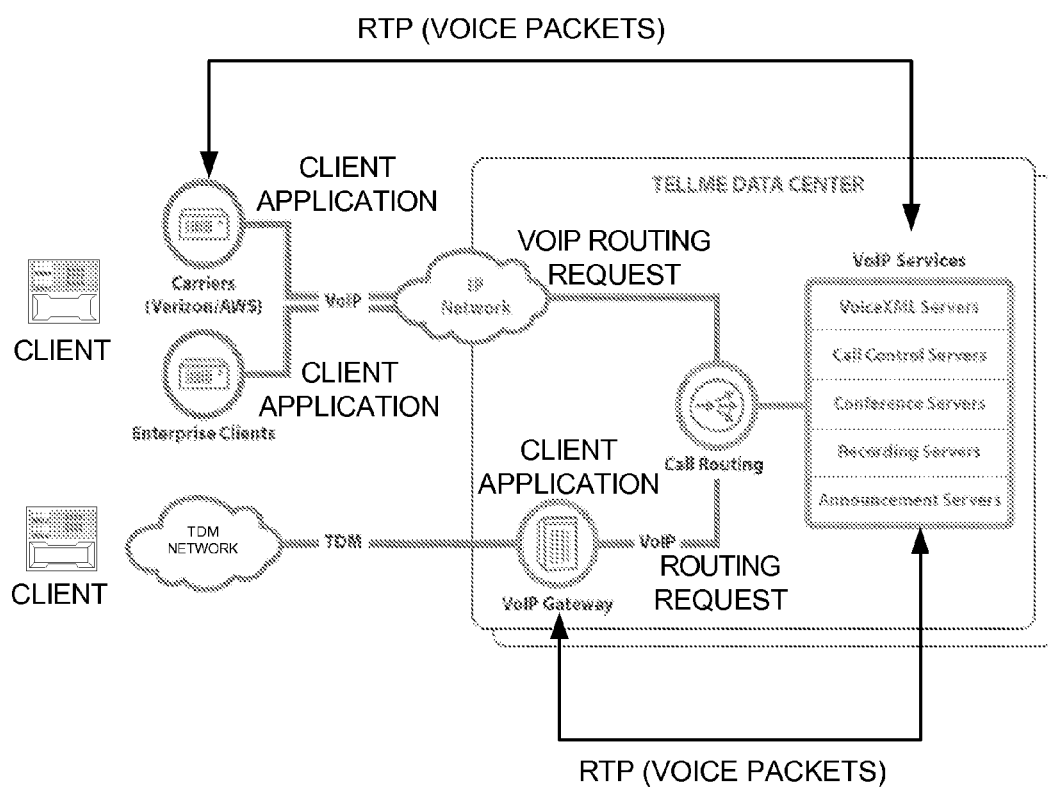
FIG. 1 is a block diagram showing an environment for transmission of VOIP calls in a shared network.

FIG. 1 shows an environment associated with one embodiment of the invention. The environment allows for the routing of telephone calls to a termination in a shared network. A termination can be a specific hardware component, such as a server, or a software application residing on a server. A termination may include a voice response application, for example, responding to a request for movie times from a client. Other terminations may provide call recording, forwarding, or conferencing. In this environment, a client places a telephone call using either the POTS (plain old telephone service) TDM network or initiates a VOIP telephone call. If the telephone call is a POTS call, the call is directed to a data center having a VOIP gateway. The data center may include a group of ports including TDM ports and IP ports for receiving TDM calls or VOIP routing requests. The VOIP gateway converts the TDM phone call into a series of VOIP packets. Additionally, a client application on the VOIP gateway initiates a request to a call routing entity for routing information for the VOIP packets. If the telephone call is a native VOIP call, the client application resides at the client's premises and initiates the request for routing information to the call routing entity.

The call routing entity may include a two-tiered virtual switch that includes at least a first tier router and a second tier router. The term "router," as used herein, is to be broadly interpreted as any network device capable of participating in the transmission of data. The first tier router receives a DNS request from the client application for a listing of second tier routers that can complete the call routing based on a requested application. The client application receives back the listing of available second tier routers, selects one of the second tier routers and then initiates a SIP session through the second tier router to one of the terminations capable of providing the requested applications. Once the termination is determined, the termination and the client application may communicate directly using their IP addresses employing the real-time protocol (RTP) for transmission of the voice media. As shown, the terminations may include Voice XML applications, call control services, conference calling services, recording services, and voice announcement services.

Figure 2:
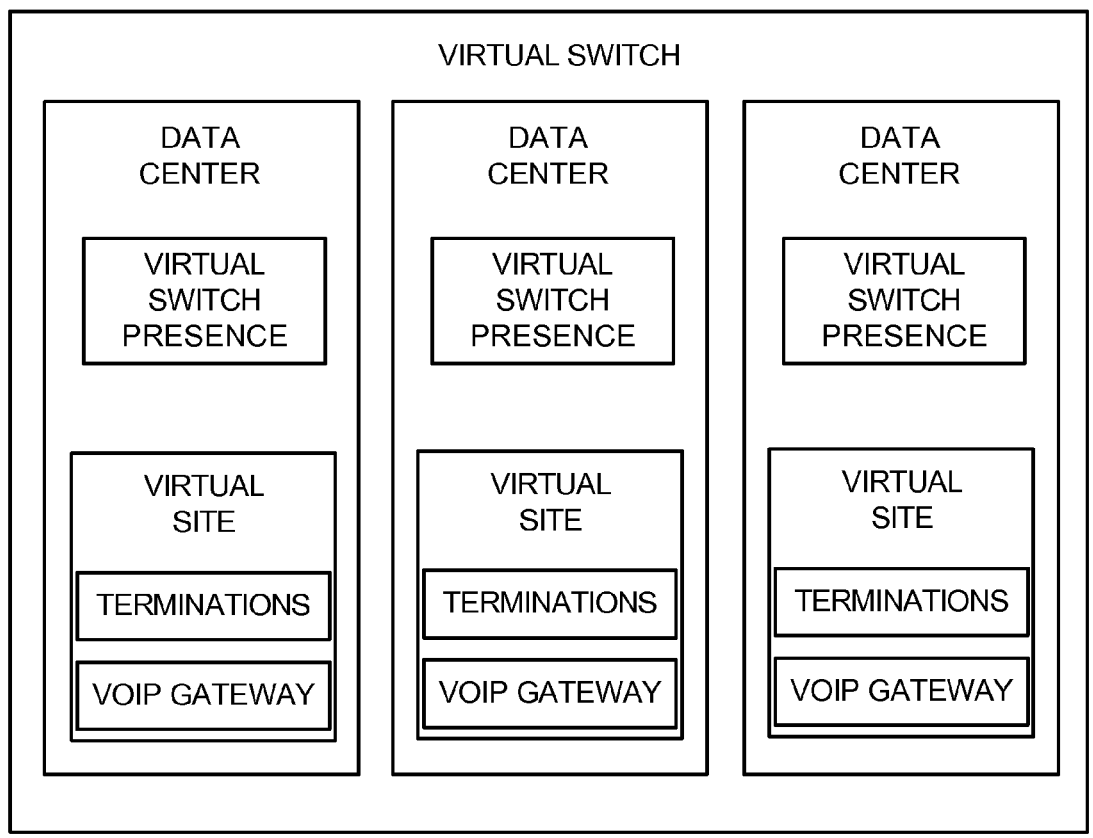
FIG. 2 shows a virtual switch with multiple data centers.
Figure 3:
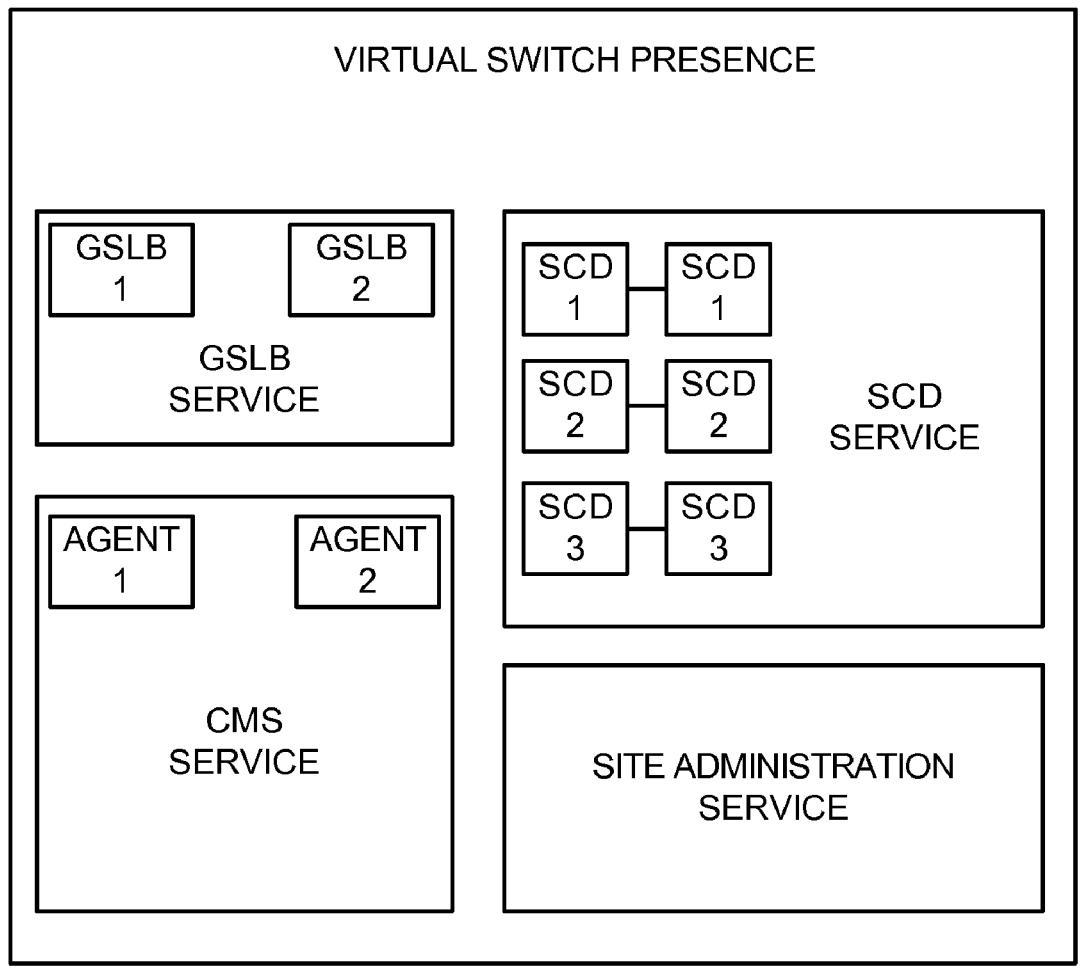
FIG. 3 shows a virtual switch presence.

Although FIG. 1 shows only a single data center, the virtual switch may be associated with multiple data centers, as shown in FIG. 2. Each data center may include a virtual switch presence and may be associated with one or more virtual sites. A virtual site can be located at the data center or remote from the data center. The virtual site may include the VOIP gateway and the terminations. The virtual switch presence is shown in FIG. 3. The virtual switch presence may include a global server load balancer (GSLB) service, a signaling call distributor (SCD) service, a call management system (CMS) service and a site administration service. Each of these services will be explained further below. In one implementation, a given virtual site may belong to a single virtual switch presence. That virtual switch presence may route calls to many virtual sites, all possibly residing in geographically distinct locations.

As shown in FIG. 3, there are two GSLBs, three pairs of SCDs (e.g., active and standby SCDs), and two CMS agents within the virtual switch presence. Even though multiple components (GSLBs, CMS agents, and SCDs) are shown, more or fewer GSLBs, CMS agents, and SCDs can be provided for the virtual switch presence.

In the description to follow, the GSLB and SCD may collectively or individually be referred to as a "call router" or simply a "router" of the virtual switch presence. The GSLBs may comprise the first tier of routers and the SCDs may comprise the second tier of routers.

Returning to FIG. 2, the call routers of the virtual switch may distribute the calls among the data centers and terminations in accordance with a network routing scheme. Each data center includes one or more terminations and different data centers may have the same termination types. For example, two data centers may each have a speech recognition program that provides directory assistance.

The routing scheme may include a hierarchy of rules that are parameterized based on a set of dynamic distribution parameters. The dynamic distribution parameters might include state information (e.g., information regarding the health and/or available capacity) regarding network components (e.g., GSLBs, SCDs, and/or terminations) and/or business information (e.g., business considerations, service-level agreement considerations, etc.). The values of the dynamic distribution parameters need not be known ahead of time. Instead, the values of the dynamic distribution parameters may be determined at run time (e.g., when the rules of the routing scheme are processed). The same routing scheme may be activated on each of the call routers. A first tier router may start at the top of the hierarchy and process the rules. At a certain point in the rules, the first tier router may determine that the call needs to be handed off to the next tier router. The next tier router may receive the call and continue processing of the rules.

Exemplary Communication Flow

Figure 4:
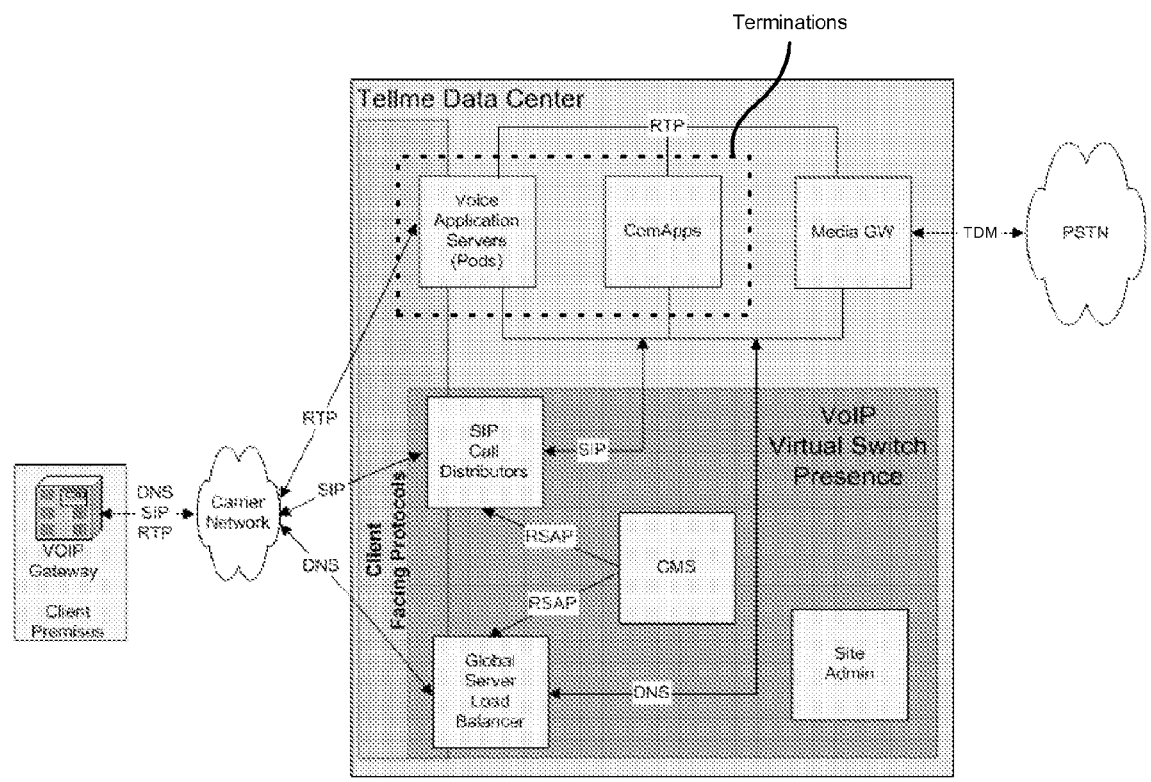
FIG. 4 is a block diagram showing exemplary communication flow within the shared network.

FIG. 4 is a block diagram showing exemplary communication flow within the shared network. The shared network includes a data center having an associated virtual switch presence and terminations. The virtual switch presence is a logical representation of components at a data center that form part of a virtual switch. A virtual switch need not be located at a single data center and can extend across data centers, as shown in FIG. 2.

As shown in FIG. 4, a VOIP gateway may be located at a client's location. In other embodiments, a VOIP gateway may be located at a data center or logically associated with the virtual switch within the network. A user may initiate a telephone call at a client's premises or a user's telephone call may be directed to the client's premises. The telephone call may pass through the VOIP gateway. The VOIP gateway may include a client application that can communicate with the shared network using known protocols, such as DNS (domain name system), SIP (session initiation protocol) and RTP (real time protocol). The client application on the VOIP gateway may initiate a DNS request that is directed to a GSLB at a known location within the virtual switch. The GSLB receives the DNS request and returns a listing of SCDs that can route the call to an appropriate termination within a data center. The GSLB determines the list of SCDs based on a requested application identified in the DNS request. The application may be a voice application that resides on a server, such as a Voice Application Server (Pod) shown in FIG. 4. The listing of SCDs determined by the GSLB may be based on the routing scheme and may be based on the proximity of the client to a data center as well as one or more of the dynamic distribution parameters.

After the GSLB returns a listing of possible SCDs to the client application, the client application selects an SCD and sends a SIP invite request to the selected SCD. The SCD may determine if there are one or more possible terminations for completing the request and selects a termination among the possible terminations. The SCD may perform this selection process based on the routing scheme.

The routing scheme may be generated and received from a CMS. Both the GSLB and the SCDs may receive the same routing scheme. The GSLBs and SCDs parse the routing scheme and determine their individual roles in implementing the routing scheme.

After parsing the routing scheme, the SCD may evaluate the rules of the routing scheme and determine a set of one or more terminations. The SCD may use a random number generator and a selection algorithm to select one of the terminations. The SCD forwards the SIP invite request to the termination (e.g., a voice application server, a communication application server (commapps), etc.). A communications application server contains one or more applications for routing of a telephone call and performing such functions as call forwarding and conference calling. The voice application servers can have such voice activated applications as speech recognition, text to speech processing, and voice dialogs. Once the termination receives the SIP invite request, the termination responds back to the invite by providing the client application with such information as the address of the termination (e.g., the IP address). The client application can then communicate directly with the termination and forward the call's media content (e.g., voice data) in packets through the RTP to the termination and similarly the termination can communicate with the client application using RTP.

Although FIG. 4 shows a single data center, the virtual switch may operate with any number of data centers. The virtual switch components (CMS, GSLB, site administrator, and SCDs) can be located remote from a data center and can be shared across multiple data centers. In one embodiment, each data center may have an associated SCD and/or GSLB. Similarly, FIG. 4 shows the virtual switch as having only a single GSLB and SCD. In practice, however, the virtual switch can include any number of GSLBs and/or SCDs.

The virtual switch may include a CMS. The CMS distributes the routing schemes to the GSLBs and SCDs. The routing scheme may be implemented within a data structure using the XML format and will be referred to hereinafter as "routing scheme XML" (RSXML). A network operator creates the routing scheme and monitors the network state. Based on changes in the network state, the network operator can alter the routing scheme and implement a new routing scheme. The CMS sends the routing scheme to the GSLB and the SCD in a protocol that will be referred to as routing scheme activation protocol (RSAP), although other protocols may be used for distributing the routing scheme.

The site administrator maintains the network state information, including the dynamic distribution parameters, such as health and available capacity. The site administrator monitors and receives responses regarding the state of the networks components. For example, health is a measurement of a component's ability to perform expected tasks. For example, a processor that is several years old may not be capable of performing speech recognition and returning a response within a set period of time. The site administrator can assess health based on past performance for a given task including time to perform the task. In addition, capacity of a network component is indicative of the number of simultaneous requests that a component can process while maintaining an acceptable performance level. In certain embodiments, the site administrator monitors the available ports for a component, where the available ports may be used as an indicator of available capacity.

FIG. 4 also shows a media gateway (GW). The media gateway may receive analog TDM phone calls and convert the phone calls into a VOIP format. The media gateway runs a client application and communicates with the GSLB and the SCD using the DNS and SIP protocols, respectively. Upon determination of a termination point using the two-tiered routing architecture of the GSLB and the SCD as explained above, the media gateway passes the voice content to a termination using RTP. Thus, the media gateway allows non-VOIP calls to be routed to a termination point.

Figure 5:
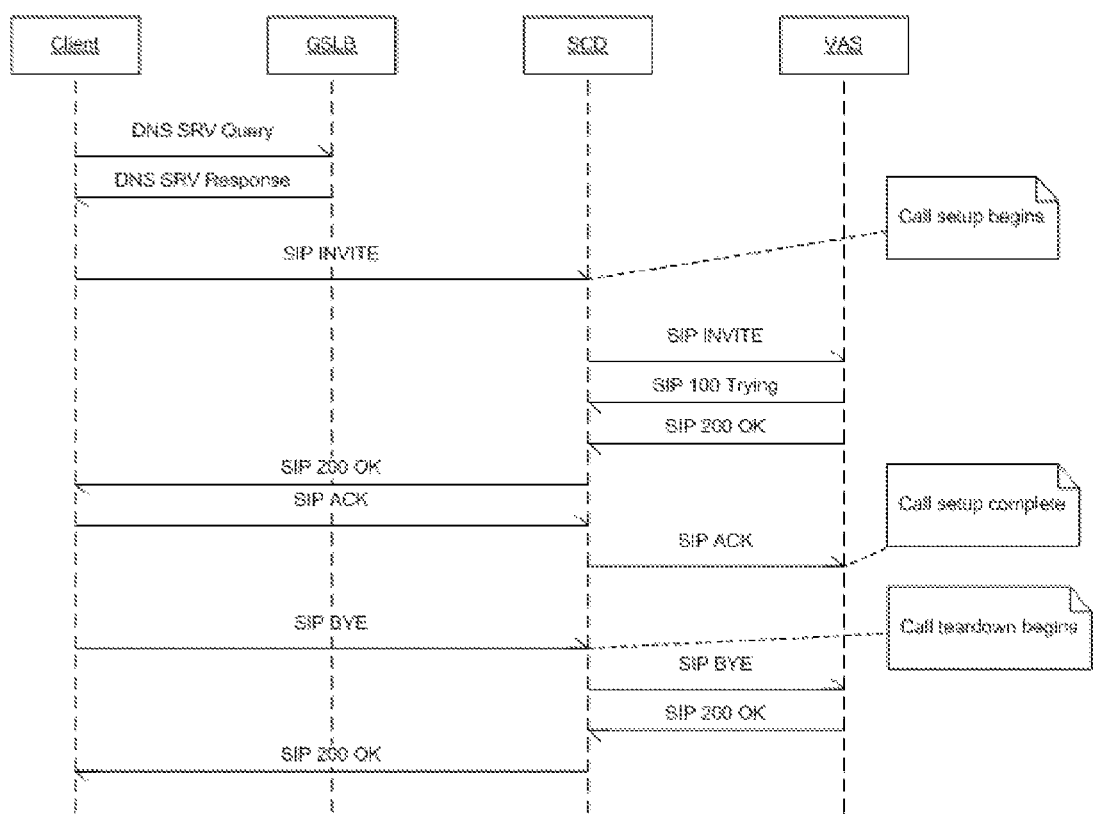
FIG. 5 is a call flow diagram showing communications between a client and the components within the shared network.

FIG. 5 is a signaling diagram that shows exemplary communications between the client application and a termination labeled as a voice application service (VAS). This diagram is provided for illustrative purposes only and other communications may occur between the components, as defined within the DNS (RFC 1033-35) and SIP specifications (RFC 3261-63).

The client application located at either the client's premises or at a data center may initiate a DNS service query to a GSLB. The DNS service query may include at least some indication of the desired termination application. The client application may determine the desired termination application based on the originally dialed telephone number. For example, three clients may share the shared network, each of which may have a different associated voice application that resides at one or more terminations at one or more distributed data centers. A user that initiates a call to access the voice application associated with a client may dial a distinct telephone number that is received by the VOIP gateway and that indicates the desired voice application. Thus, the client application may identify the application to include within the DNS service query. In another example, a user may call a telephone number that connects to a VOIP gateway. The client application receives this call and may request that the user select between various applications. Based on the received selection, the client application may identify the application to include within the DNS service query.

The GSLB may respond with a DNS service response that provides a table of available SCDs. To identify the SCDs for the table, the GSLB may rely on a routing scheme supplied by the CMS and dynamic distribution parameters, such as state information (e.g., capacity and/or health), for the SCDs, which can be provided to the GSLB via the site administrator. The site administrator may monitor the network state and maintain real-time status of the components (e.g., terminations, GSLBs, SCDs) within the shared network, accepting overrides from the CMS to adjust the reported values.

The SCDs that are provided to the client application may include SCDs that are in communication with terminations that can run the requested application. Each SCD may be physically present at a data center and each data center may employ its own SCD. The client application responds by sending a SIP invite request to one of the SCDs provided with the DNS service response. The SIP invite indicates the desired application and may include session description parameters. For example, the session description parameters may include the type of protocol for transmission of voice media between the client application and the termination.

The SCD responds to the invite request by making a routing decision using a routing scheme supplied by the CMS. For its routing decision, the SCD may also rely on dynamic distribution parameters, such as state information (e.g., capacity and/or health), for the terminations associated with the SCD, which can be provided to the SCD via the site administrator. The site administrator may monitor the network state and maintain real-time status of the components (e.g., terminations, GSLBs, SCDs) within the shared network, accepting overrides from the CMS to adjust the reported values. The SCD may forward the SIP invite or create a new SIP invite and send the SIP invite to a termination. The termination can respond back to the SCD with a trying response or may indicate that the SIP request is accepted by sending a SIP OK back to the SCD. The SIP OK message may indicate that the termination accepts the requested transmission protocol for the media and provide the IP address for the termination to the client application. The SCD, in turn, sends a SIP OK message back to the client application indicating that the termination accepts the protocol and provides the IP address of the termination. The client application acknowledges the SIP OK to the SCD and the SCD sends a SIP acknowledgement to the termination. Call set-up is then complete.

Communication can commence between the client application and the termination point using RTP (or another agreed upon protocol). The client application passes the media (e.g., voice media) to the VOIP gateway which sends the voice signal to the requesting user. Upon termination of a call, the client application initiates a SIP BYE message to the SCD and the SCD sends the SIP BYE message to the termination. The termination returns with a SIP OK message to the SCD and the SCD provides the OK message to the client application. Thus, a call is terminated.

Exemplary GSLB Components

Figure 6:
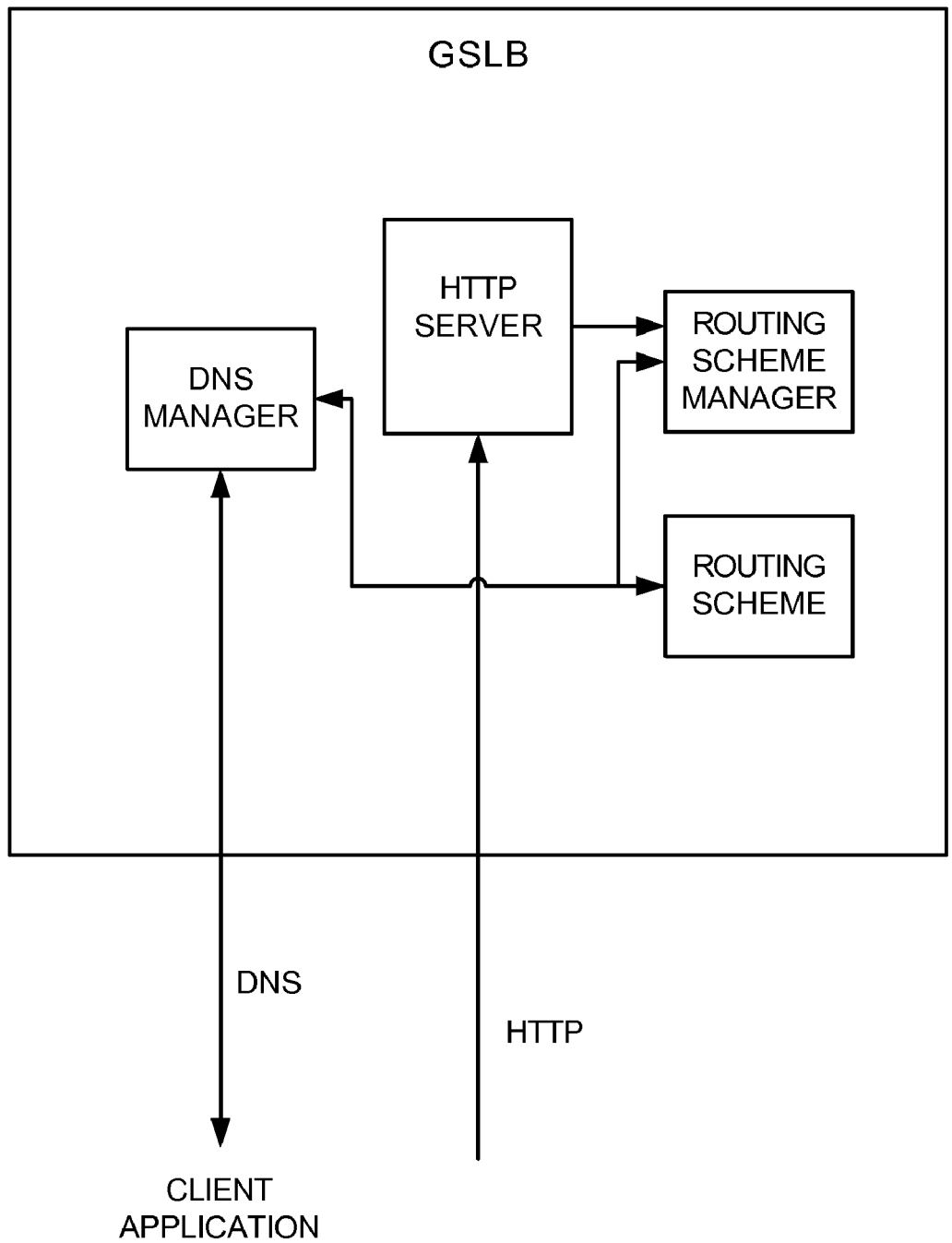
FIG. 6 is a block diagram showing exemplary components of a global service load balancer.

FIG. 6 is a block diagram showing exemplary components within a GSLB. The GSLB may perform functions similar to a DNS server and respond quickly to requests with a listing of possible SCDs. In one implementation, this listing is not constructed in real-time; rather a table of all routes for each application associated with the SCDs may be constructed. When the GSLB receives a request, the GSLB may simply perform a look-up to obtain the listing of SCDs to transmit to the requesting client.

The GSLB may include a DNS manager. The DNS manager receives a DNS request from a client application. The DNS manager specifies NAPTR and SRV strings (or another DNS-compatible format) that provide the address of one or more SCDs coupled to one or more terminations that can execute the requested application, and possibly a text string that provides a unique identifier to be included in a SIP request from the client to one of the SCDs. The DNS manager accepts, parses, and responds to these DNS requests. Within the DNS request is the name of the application or requested service. This information may be forwarded to the routing scheme manager. The routing scheme manager determines the listing of SCDs that are provided back to the DNS manager and the DNS manager formats the listing into NAPTR and SRV strings or another DNS-compatible format.

The GSLB may also include an HTTP server. The HTTP server waits for an HTTP request and directs the request to the appropriate component. For example, the HTTP server receives RSAP messages and the RSXML routing scheme and passes that information to the routing scheme manager. The HTTP server also allows for subscription to the dynamic distribution parameters through the network state protocol (NSP). The NSP provides the requested dynamic distribution parameters that are passed to the routing scheme manager. The routing scheme manager subscribes to the site administrator for the dynamic distribution parameters relating to all SCDs referenced by the routing scheme.

The routing scheme manager receives the RSXML routing scheme from the HTTP server. The routing scheme manager parses the RSXML and compiles a table for use by the DNS manager to service the DNS requests. For each RSXML routing scheme, the routing scheme manager parses the RSXML into a traversable graph in memory. The routing scheme manager builds a list of all locations that have terminations and a count of the terminations at each location. The routing scheme manager then constructs a list of applications and creates a look-up table associating the rules with the application. After building the look-up table, the routing scheme manager builds a listing of routes for each application. The routing scheme manager may access current values for the dynamic distribution parameters for all valid SCDs and store the dynamic distribution parameter values for each SCD in a table. Next, the routing scheme manager may calculate the weight for each SCD. For each SCD, the routing scheme manager may add one record to a call distribution table for the DNS response string.

The DNS manager receives the call distribution table and formats the call distribution table into NAPTR and SRV strings or another DNS-compatible format.

Exemplary SCD Components

Figure 7:
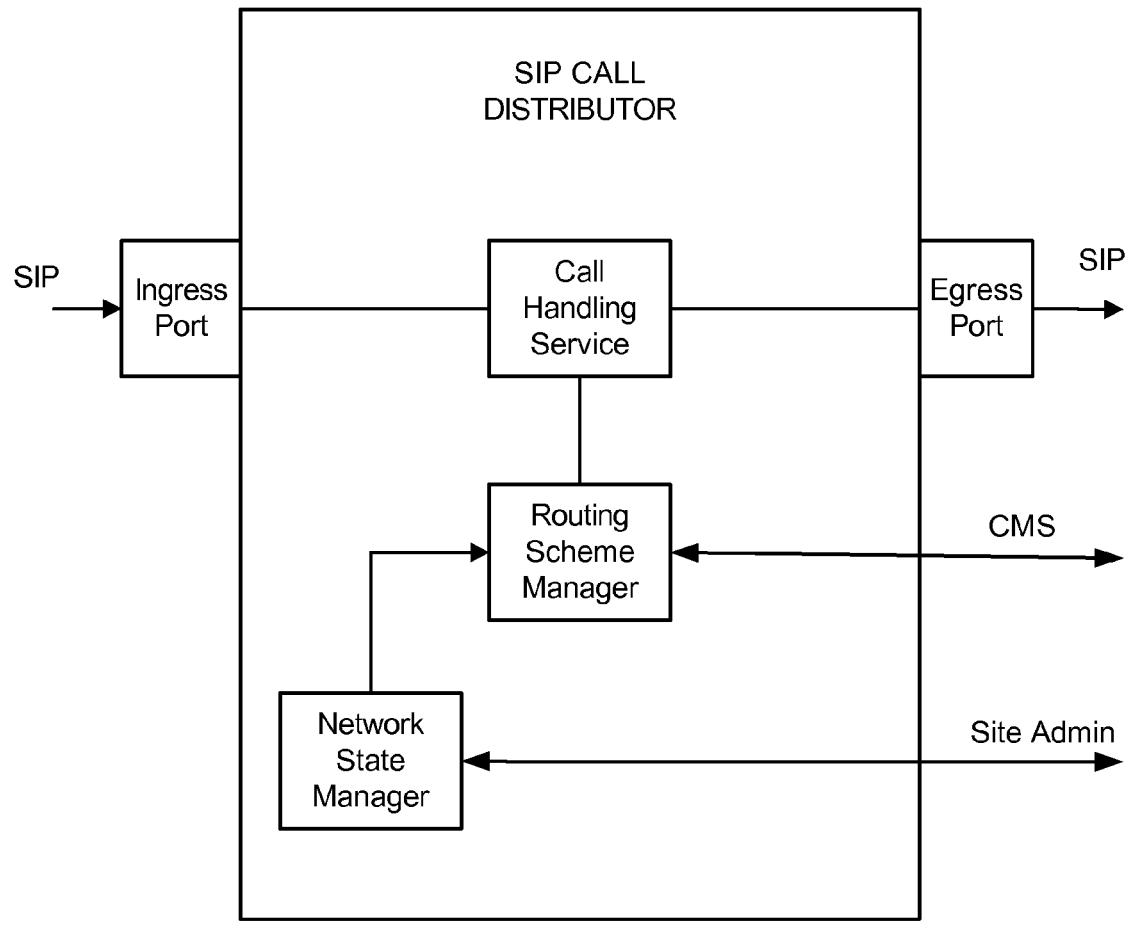
FIG. 7 is a block diagram showing exemplary components of a signaling call distributor.

FIG. 7 shows a block diagram of exemplary components of a SCD. The SCD may be a back-to-back user agent and a user agent client as is understood in the SIP RFC specification.

The SCD may receive and process inbound SIP invite messages, determine how the invite should be answered, and initiate outbound calls.

The SCD may include one or more ingress ports and one or more egress ports. The SCD may also include a call handling service module. The call handling service module manages the routing of requests from an ingress port to one of the egress ports. When a SIP invite request is received at an ingress port, the call handling service module forwards the SIP invite request to a routing scheme manager. The routing scheme manager determines a termination based on a routing scheme supplied by the CMS. The SCD may also rely on dynamic distribution parameters, such as state information (e.g., capacity and/or health), for the terminations associated with the SCD, to determine the termination. The call handling service module directs the invite to a termination through one of the egress ports.

The SCD may also include a network state manager. The network state manager subscribes to the site administrator using, for example, NSP in order to receive notification of dynamic distribution parameters. The dynamic distribution parameters for the terminations are passed to the routing scheme manager.

Figure 8:
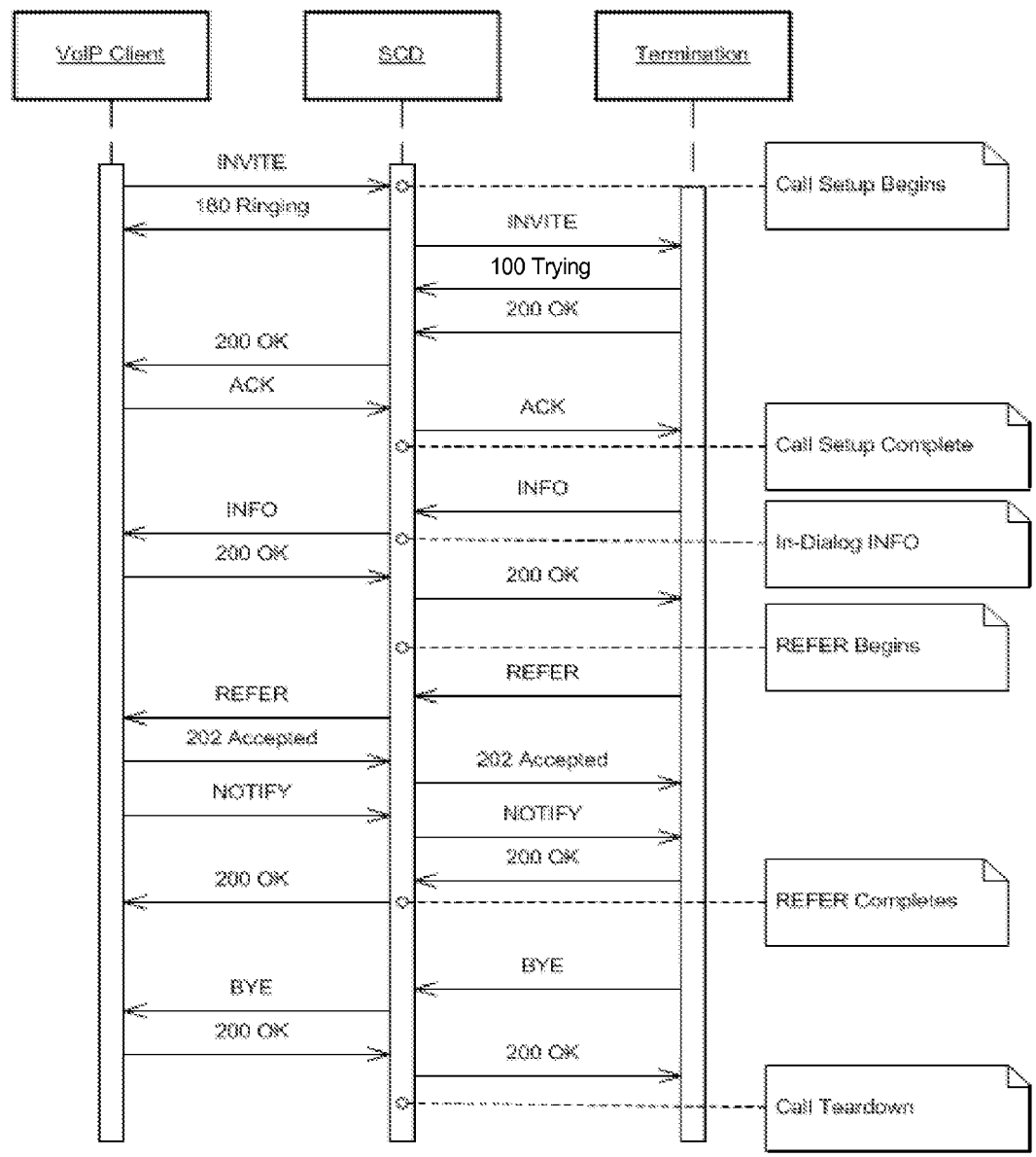
FIG. 8 shows an exemplary call flow between a client application, a signaling call distributor, and a termination.

FIG. 8 shows an exemplary call flow between a client application, the SCD and the termination. After receiving the invite request, the call handling service module responds by sending a ringing message to the client application while the routing scheme manager determines the termination.

The routing scheme manager compiles an RSXML routing scheme into an internal object that can be used by the call handling service module for routing calls. The routing scheme manager parses the RSXML code pruning any rules and associated properties that are not associated with terminations coupled to the SCD.

The routing scheme manager determines a listing of possible terminations by applying the rules and properties parsed from the RSXML. Application of the rules and properties will be further explained below. In order to determine a termination, the routing scheme manager creates a tree data structure containing the terminations. The nodes within the data structure are associated with the available applications that reside at the termination. Terminations and termination groups may have associated weightings based on the dynamic distribution parameters associated with the termination or termination group. For each application, the routing scheme manager creates an application tree that has targets that point into the termination group tree. Each time the routing scheme manager receives a SIP invite request, the routing scheme manager evaluates the routing rules to find a termination group by traversing the application tree and the termination group tree. A termination group can have one or more terminations. If there are multiple terminations, the routing scheme manager may use a random number generator to select between the various branches of the tree to determine a termination.

Once the termination is selected, the routing scheme manager provides the selected termination to the call handling service module. The call handling service module forwards the SIP invite request to the selected termination. The termination indicates whether the termination can process the request. If the termination can process the request, the termination signals with an OK message that is directed through the SCD to the client application. In the initial request, the client application may provide its address information (e.g., IP address). In the OK message, the termination indicates the communication protocol that may be used for communication with the client application (e.g., RTP) and the termination's address information (e.g., IP address). The client application responds to the OK message with an acknowledgement. The acknowledgement indicates that the client application can communicate with the termination using the protocol suggested by the termination. This acknowledgement message is passed through the SCD to the termination. At that point, the call set-up is complete. It should be recognized that the termination and the client application may negotiate for using different protocols and that there may be several communications between the termination and the client application before call set-up is complete. The termination and client application can then directly communicate using a protocol, such as RTP, for transferring voice packets. The termination may provide a voice service and the termination can receive voice packets, perform speech recognition and respond to the recognized speech with a voice response transmitted as IP packets.

The routing scheme generated by the CMS may be activated on the GSLBs and the SCDs using a protocol that is referred to as RSAP (routing scheme activation protocol). The RSAP allows for synchronization of the routing scheme between the GSLBs and the SCDs over the life of a call. The CMS allows network operators to make changes to the routing scheme and to forward the new routing scheme to call routers, such as the GSLBs and/or SCDs. Each call router includes at least two slots for routing schemes. Each slot holds a different routing scheme and one of the routing schemes is designated as active. Each slot may have its own unique address (e.g., IP address). The address of the slot may be used to determine which routing scheme to use for a particular call. For example, when a GSLB determines a list of SCDs for a client application, the GSLB may identify the current active routing scheme and, for each of the SCDs, determine the address of the SCD that corresponds to the current active routing scheme. The GSLB may include these addresses in its list of SCDs.

Once a user initiates a call and the CMS causes the call routers to designate the routing scheme as active, that same routing scheme may be used until the call is completely setup, which may include multiple retry attempts across geographically diverse data centers. This may be true even if a network operator activates a new routing scheme during processing of the call setup. The RSAP may include a heartbeat signal that the CMS multicasts to the call routers to enable them to dynamically discover the routing scheme currently designated as active throughout the network. The transmission of the heartbeat signal provides a mechanism to account for network communication problems. For example, the CMS may distribute a routing scheme; however, the routing scheme may not be received by a call router. By multicasting the heartbeat signal, the call router may recognize that it does not have the proper routing scheme designated as active, and can send a request to the CMS for retransmission of the routing scheme. The multicasting of the heartbeat signal might also be useful in the situation where a call router is restarted after maintenance (e.g., after a software upgrade). In this case, the call router gets informed of the current routing scheme automatically.

The CMS prepares the non-active routing scheme for use by the call routers in the event that a call needs to switch to the non-active routing scheme or the call began with the non-active routing scheme. When the CMS constructs a new routing scheme, the CMS uses RSAP to provide two commands to the call routers: a prepare command and an activate command. The prepare command causes the call routers to load and verify the routing scheme. The activate command causes the new routing scheme to be activated within the network.

The use of active and non-active routing schemes may ensure that the routing scheme used for a call is deterministic based on whichever routing scheme was active when the call was first received. When completing a call, there are retry mechanisms and a number of servers participating in the call. When a GSLB is contacted, the GSLB may return a list of SCDs to the client application. The client application may try an SCD from the list and get back a failure response or a timeout. The client application may then try another SCD. While the client application is doing all of these attempts, either the current active routing scheme or the previous non-active routing scheme is used for the duration of the call. This may guarantee the atomicity of the call routing so that when a call is first received, the same routing scheme is used at all the routers that participate in handling that call for the duration of the call.

As described above with regard to FIG. 3, the SCDs may be provided in pairs of active and standby SCDs. In this way, a new routing scheme can be implemented on a standby SCD before being implemented on an active SCD to minimize failures that may be caused by the new routing scheme.

FIG. 9 shows a routing scheme data structure that may be used. The data structure is based on the extensible mark-up language (XML) allowing each element of the routing structure to be a separate tag. The tags are provided in a hierarchy. The root element is the rsxml tag. This element identifies the XML code as a routing scheme. Below the rsxml tag, there are children tags for the routing scheme. The first child tag is the <tg> element that represents a group of terminations. The second child tag is the <app> element that represents the application (e.g., voice communication application) to which a call is to be routed. The <app> element can include one or more child elements.

Applications can have associated rules defined in the <rule> element. The rules can have routing properties formed in the <prop> element. Further, rules can state that a call associated with a particular application is to be routed to a termination in the <termref> element or to a group of terminations <tgref>. The properties element may have its own child elements including: <health>, <retry>, <dist>, <confine> and <error>. The routing scheme may dictate routing for a rule based on the health <health> of the termination or of the SCD(s). The number of attempts for establishing a connection with a termination or SCD is defined by the <retry> element for the rule. A rule can determine load balancing with respect to other rules, groups of terminations or specific terminations using the <dist> child element. Rules can also limit calls for an application to a specific termination using the <confine> element. If the confine element is not part of the routing scheme for a rule and the call does not complete after a number of retries, the SCD may redirect the call to another termination. Thus, the confine element can limit the redirection of calls. Rules can also be defined for errors <error> that may occur during call initialization or completion. For example, if an error occurs, a call could be redirected to a different data center, termination, or group of terminations.

The GSLB receives the RSXML routing scheme through RSAP. The GSLB creates a table of available SCDs that are associated with specific applications. The table includes a weighting for each SCD. The weighting may simply be the result of the number of terminations associated with each SCD (e.g., SCD1 has 10 terminations, SCD2 has 5 terminations, weight factor for SCD1 is 2:1). In other instances, the weighting factor may result from a determination based on the dynamic distribution parameters associated with the terminations and/or SCDs.

The GSLB may create this table by parsing the routing scheme. The GSLB inquires whether an application exists within the routing scheme that has not been processed and added to the table. If there is an application, the GSLB continues to see if there is a rule that is associated with the application. If a rule does not exist, the GSLB identifies the <tg> element (termination group) for the application. The GSLB contains a listing of SCDs and <tg>'s. Based on the termination group, the GSLB determines one or more SCDs that are associated with the termination group and adds the SCD(s) to the table.

If a rule exists, the GSLB applies the rule and any associated properties with the rule to determine the one or more terminations that are associated with the applied rule. The GSLB performs a look-up based on the termination or termination group and adds the associated SCD to the table for the application. This process continues until each application within the routing scheme has been added to the table.

If a health element <health> is present within the routing rules for the SCDs, the GSLB may retrieve the health information from the site administrator for the SCDs and terminations. The GSLB may evaluate the rule with regard to the health of the SCDs. The system can be configured so that the site administrator automatically informs the GSLB if a substantial change in the state of an SCD or termination occurs, for example, the component is taken out of service or has failed. Upon receipt of this information, the GSLB may update its table that relates the SCDs and applications. Additionally, the weighting factors could be updated.

Because the GSLB may include a DNS server, the GSLB may evaluate the routing scheme prior to receiving a call and may not perform an evaluation of the routing scheme in real-time.

The SCD also parses the routing scheme that is received as an XML file through the RSAP. The SCD evaluates the routing scheme each time a SIP request for a call is received. The SIP request from the client includes a reference to a desired application. The SCD may disregard any <tg> references that are not associated with the terminations for the SCD. The SCD may perform this by evaluating each rule within the routing scheme and, upon encountering a termination group not associated with the SCD, terminating the evaluation. In another embodiment, the SCD may build a tree structure of the terminations and associated SCDs and eliminate any branches in the tree structure that lead to data centers that are not associated with the SCD.

The SCD may evaluate the rules that are applicable to the terminations associated with the SCD for the application specified in the SIP request. The SCD looks at the properties of the rule for the application and applies any dynamic distribution parameters that are received from the site administrator associated with the terminations to evaluate the rule. The SCD builds a memory compiled version of the available termination points. The SCD employs an algorithm to select a termination. For example, assuming that all terminations are equal, the SCD may employ a random number generator that is used to select a termination. The routing scheme may limit the terminations that can be selected or have a rule that bases the probability of selecting a termination based on a dynamic distribution parameter, such as the health (<health> tag) and/or the capacity (<dist> tag).

Provided below are two sample RSXML excerpts for an application.

```
<rule>
  <prop>
    <dist alg="fixed_prob"/>
  </prop>
```

```
    <tgref ptr="site1" weight="1"/>
    <tgref ptr="site2" weight="999"/>
  </rule>
```
The GSLB may evaluate the rule for the application and create a table entry that indicates that the application is associated with the SCDs for site1 and site2. The table may indicate the weighting of 1/1000 for the SCD associated with site1 and 999/1000 for the SCD associated with site2 for the application. When a DNS request is received by the GSLB, the GSLB may provide connection information, such as the IP address of the active routing scheme slot for the two SCDs to the client application. The client application may select one of the SCDs and initiate a SIP invite request. The client application may select the SCD based on the order in which the SCDs appear in the list or the client application may have its own selection criteria. For example, the client application may select an SCD based on weighting factors or may randomly select an SCD. If the client application selects the SCD associated with site1, the SCD evaluates the routing scheme and ignores the reference to site2. As there are no specific rules regarding the terminations in this routing scheme, the SCD can randomly select a termination from the available terminations at site1. The SCD may generate a random number and can select one of the terminations based on an algorithm that includes the random number.

Provided below is a second example of a routing scheme:
```
  <app domain="abc.efg.sip.hijklm.com">
    <rule>
      <propref ptr="std-health"/>
      <prop>
        <retry max="3" timeout="2000"/>
        <dist alg="fixed_prob"/>
      </prop>
      <rule weight="40">
        <prop>
          <dist alg="available_capacity"/>
        </prop>
        <tgref ptr="p123.term1"/>
      </rule>
      <rule weight="60">
        <prop>
          <dist alg="available_capacity"/>
        </prop>
        <tgref ptr="p234.term5"/>
      </rule>
    </rule>
      </app>
  </rule>
```
In this example, the GSLB determines the SCDs for the p123.term1 site and p234.term5 site that are associated with the application and that they are to be weighted 60/40. If the client application selects the SCD for the p234.term5 and the SCD receives a SIP initiation, the SCD disregards any rule that references the p123.term1 site and selects the termination based on the available capacity of the terminations. Thus, each of the two call routers receives the entire routing scheme, evaluates, and implements the portion of the routing scheme that is applicable to that call router.

The routing scheme manager of both the GSLB and the SCDs may subscribe to the site administrator for dynamic distribution parameters, such as state information. The GSLB requests dynamic distribution parameters associated with the SCDs and terminations for the SCDs, whereas the SCDs subscribe to information regarding the dynamic distribution parameters associated with the terminations to which the SCDs are coupled. Both the GSLBs and the SCDs may subscribe to dynamic distribution parameters associated with all of the SCDs and terminations within the network or the GSLBs and SCDs may subscribe to dynamic distribution parameters on a periodic basis based on the active routing scheme for SCDs and terminations relevant to implementation of the active routing scheme.

The GSLBs and SCDs may use a stochastic model to make their routing decisions based on the dynamic distribution parameters. As the GSLBs and SCDs parse the routing scheme, the GSLBs and SCDs determine the current set of dynamic distribution parameters and apply the dynamic distribution parameters to the rules. For example, the GSLBs and SCDs may use a random probability function based on weight to select the next termination or the next rule to apply. There can be an arbitrary nesting of rules based on an arbitrary number of dynamic distribution parameters.

To illustrate this, assume that there are four terminations and the rules specify that the first two terminations ("first group of terminations") are routed to based on their health and the second two terminations ("second group of terminations") are routed to based on their available capacity. Also, assume that a top level rule indicates that calls are to be routed based on capacity. When a call is received, it may be determined what the available capacity is for the first group of terminations together and what the available capacity is for the second group of terminations together. The determined capacity may be used as a weight for each of the first and second groups of terminations. Assume that the determined capacity of the first group is 100 and the determined capacity of the second group is 200. A probability function may be applied such that one third of calls are likely to go to the first group and two thirds are likely to go to the second group. Assume that the call is determined to go to the first group. According to the rules, one of the terminations in the first group may then be selected based on its health.

Exemplary CMS Components

Figure 10:
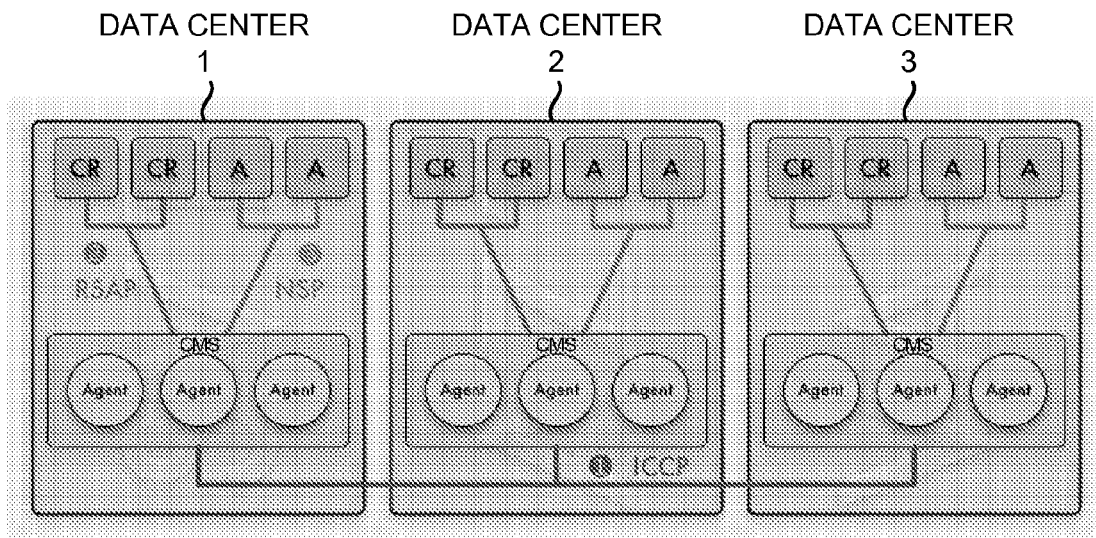
FIG. 10 is a block diagram showing the communications between call management agents, call routers, and site administrators within and between data centers.

The CMS, as previously indicated, is the management center for the VOIP network. The CMS is represented in FIG. 10 by the box that surrounds the agents at each data center. The CMS includes one or more agents that may be distributed throughout the network at the physical data center locations. The agents may be software, hardware or a combination thereof. In one embodiment, the CMS agents are daemon processes.

A network operator wishing to manage the network can access the CMS through a user interface. The user interface allows the network operator to create routing schemes in the RSXML language (previously discussed). The operator may distribute the RSXML routing scheme to each of the call routers (GSLBs and/or SCDs) and issue a prepare command to the call routers for preparing the routing scheme for activation, as represented by the line marked ② in FIG. 10.

After receiving the prepare command, the GSLBs and/or SCDs parse the RSXML code and format the instructions so that they can be implemented. The instructions may be saved in memory. The network operator can then issue an activate command that causes the call routers to retrieve the instructions from memory and place the instructions for the routing scheme into the active memory slot. The routing scheme that is deactivated may be stored in the second slot so that calls that began using the deactivated routing scheme may continue using that routing scheme until call completion, as described above. Further, the CMS may save the deactivated routing scheme within the call routers, so that in the event of a failure, the CMS can issue an activate command and revert back to the deactivated routing scheme. In certain embodiments, a routing disposition is transmitted from the CMS to the call routers. The routing disposition includes a pair of routing schemes. For example, Routing Scheme A may correspond to the active routing scheme and Routing Scheme B may correspond to the routing scheme in the second slot for the call routers. The network operator can issue a new routing disposition that includes Routing Scheme C and Routing Scheme A. Routing Scheme C may correspond to the new active routing scheme and routing scheme A may be placed in a prepared state in the second slot of the call routers.

The routing scheme may contain the static RSXML content that uses the dynamic distribution parameters (e.g., state information and/or business information) associated with the components within the VOIP network including the terminations, GSLBs, and SCDs. Once a routing scheme is implemented, any change to the routing scheme by a network operator may cause a new routing scheme to be generated. The operator may create a new routing scheme and issue the prepare and activate commands to be distributed to all of the call routers, but the operator may not issue a change to a portion of the routing scheme once the routing scheme is active. However, the CMS may allow an operator to issue overrides, regarding any of the dynamic distribution parameters, to the site administrator using the user interface. By allowing for overrides, the operator can adjust the routing scheme and can direct call traffic to either different terminations, data center locations or different SCDs. For example, a routing scheme may require a 100/0 split between two terminations so long as the first termination has at least a 30% health score and a 0/100% split when the first termination falls below 30%. During operation, the first termination may have a health score of 25% and the operator may update the second termination. In this scenario, the operator could override the health score of the first termination and force all of the calls to be routed to the first termination while the second termination is being updated. In another example, a network operator may want to direct call traffic to a termination even though the health of the termination is below an acceptable level. If the network bandwidth is near full utilization, the network operator may decide that it is better to direct calls to terminations with a low health score that may not meet certain desired criteria (e.g., wait time, time between request and response etc.), rather than not to complete a call at all.

In addition to allowing the network operator to create and update routing schemes, the user interface of the CMS may allow the network operator to view dynamic distribution parameters associated with each component in the network. Additionally, the network operator can obtain the state of the CMS, which includes the current routing scheme, and in addition, filters and routing rules used to create the current routing scheme. Filters are groupings of terminations/call routers and may include, for example, groupings according to: geographic location, state, processing power, and/or status. This listing should not be considered a limitation on filter types. In creating the routing scheme, the network operator may apply routing rules to the filters. For example, a filter may group terminations according to status (e.g., active, inactive, verification, or maintenance) and the routing rule may apply only to active terminations. For example, a routing rule might indicate that calls are to be routed equally between active terminations at data center X. These filters and routing rules provide the network operator with information concerning the reasons for the resulting routing scheme. This information allows the network operator to view the routing scheme at a higher level of abstraction. Elaborating further, a routing scheme may indicate that calls for Application A are to be distributed 50/50 between two terminations at a data center.

The routing rules and filters may provide further insight. For example, the filter may group terminations according to a version of software release. A routing rule may distribute calls equally among all terminations executing version 3.0 software. Thus, by providing this additional information concerning routing rules and filters, the network operator may obtain a clearer understanding of the logic behind the routing scheme and, therefore, determine that the rules and filters were created, in the example, based on the version of the software.

The CMS may permit the network operator to create the routing scheme using the user interface. The network operator may also initiate overrides using the user interface.

As shown in FIG. 10, this embodiment of the CMS may include a group of redundant CMS agents at each data center (data centers 1, 2, 3). It should be understood that in other embodiments, more or fewer CMS agents may be located at each data center, and the number of data centers may be different. Each data center may include a dynamically assigned coordinator CMS agent that coordinates distribution of the routing scheme to other agents and call routers located in the same data center. If a CMS agent receives a routing scheme update from the user interface, the CMS agent may select CMS agents at each data center to act as coordinator for their center. Using a transaction mechanism, it may then communicate the routing scheme data to the coordinators, as shown by the line marked (1), who are then in charge of distributing the routing scheme data to other CMS agents and call routers at their location.

CMS agents may multicast UDP packets containing routing scheme information (e.g., a routing scheme ID) over the channel marked as lines (1) and (2). This transmission allows for CMS agents to discover call routers and other agents and permits synchronization of the routing scheme within and across data centers. When the CMS agents and call routers receiving the UDP multicast packets parse the transmission, they determine whether they need to update their routing scheme based, for example, on a comparison of the routing scheme ID contained in the transmission to a routing scheme ID associated with their active routing scheme. If so, they may request distribution of the new routing scheme. The multicast packets may also be used for dynamically discovering new CMS agents and call routers when they respond to the multicast packets.

If a network operator requests an override of a dynamic distribution parameter, the user interface may direct the override to a CMS agent that may forward the override to the coordinator CMS agent for the data center. The coordinator CMS agent contacts the site administrator issuing the dynamic distribution parameter and causes the site administrator to override the dynamic distribution parameter, as shown by the line marked ③. It should be understood that the site administrator issuing the dynamic distribution parameter may not be located at the same data center as the CMS agent, and thus, the CMS agent may communicate override information across data centers.

Site Administrator

Figure 11:
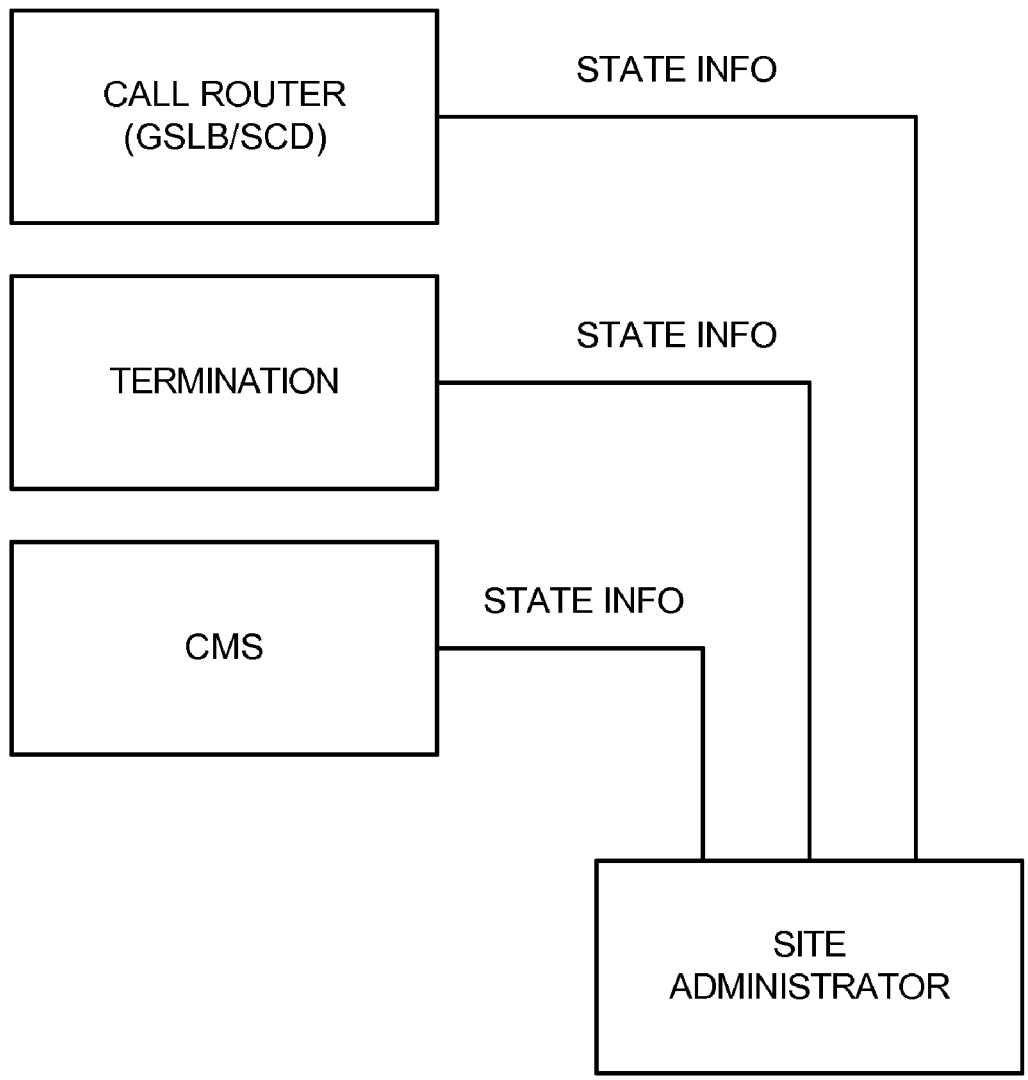
FIG. 11 is a diagram showing communication between a site administrator and a call router, a termination, and a call management system.

A site administrator, as shown in FIG. 11, may gather values for the dynamic distribution parameters, such as network state information, from each of the call routing and termination components in the network. In addition, the site administrator may obtain state information from the one or more CMS components in the network. The network may implement an advertise/subscribe model by which the network components advertise over a channel that their state information is available. The site administrator may subscribe to all advertisements and maintain a database containing real-time state information about the network. The site administrator may advertise the network state. The call routers can subscribe to the advertisement of the site administrator. The call routers can subscribe to a subset of the network state and can acquire the state information of the components that are relevant to their routing decisions. For example, a SCD may subscribe to the network state information related to the terminations for which the SCD is responsible. Similarly, a GSLB may subscribe to SCDs and terminations state information that relate to routing schemes that are present within the two slots of the GSLB.

CONCLUSION

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, while series of acts have been described in various places throughout the specification, the order of the acts may be modified in other implementations consistent with the principles of the invention. Further, non-dependent acts may be performed in parallel.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. Also, the term "set" is intended to include a single item or multiple items.

What is claimed is:

1. A call routing system to route a call to a termination, comprising:
   a first set of routers;
   a second set of routers;
   wherein, the first set of routers and the second set of routers each implement a routing scheme, the routing scheme being parameterized using dynamic distribution parameters, the dynamic distribution parameters specifying dynamically determined capacity information of the second set of routers,
   when in operation, a first router of the first set of routers:
   receives a call;
   identifies, using a first weighted random probability function, a group of the second set of routers to route the call to;
   wherein, the first weighted random probability function is determined using the dynamically determined capacity information of the second set of routers specified in the dynamic distribution parameters;
   wherein, when in operation, a second router in the group of the second set of routers selects, based on the routing scheme, the termination to process the call.

2. The system of claim 1, wherein the first router and the second router execute different portions of the routing scheme.

3. The system of claim 1, wherein the routing scheme includes a hierarchy of rules, the first router and the second router executing rules in different portions of the hierarchy of rules.

4. The system of claim 1,
   wherein the second router uses a second weighted random probability function to select the termination;
   wherein, the second weighted random probability function is determined using the dynamically determined capacity information specified in the dynamic distribution parameters.

5. The system of claim 1, wherein, the first router of the first set of routers identifies a requested application associated with the call; and identifies, based on the requested application, a group of the second set of routers.

6. The system of claim 1, wherein the first set of routers include global server load balancers and the second set of routers include signaling call distributors.

7. The system of claim 1, wherein the first set of routers and the second set of routers determine values for the dynamic distribution parameters at run time and apply the values to rules of the routing scheme.

8. The system of claim 1, wherein each of the first set of routers and each of the second set of routers include a first routing scheme based on a first set of the dynamic distribution parameters and a second routing scheme based on a second set of the dynamic distribution parameters.

9. The system of claim 8, wherein the first router and the second router use one of the first routing scheme or the second routing scheme for a duration of a routing of the call when the routing scheme changes during the routing of the call.

10. The system of claim 8, wherein the first router determines an active routing scheme from the first routing scheme and the second routing scheme, when the call is received, and the first router and the second router use the active routing scheme for a duration of the routing of the call.

11. The system of claim 10, wherein the first router and the second router assure a deterministic routing of the call based on the active routing scheme.

12. The system of claim 8, wherein the first routing scheme is identified based on a first address and the second routing scheme is identified based on a second address.

13. The system of claim 1, wherein the dynamic distribution parameters further include state information.

14. The system of claim 1, wherein the dynamic distribution parameters further include business information.

15. The system of claim 1, wherein the dynamic distribution parameters further include health information.

16. The system of claim 1, further comprising:
   a call management system to distribute the routing scheme to the first set of routers and the second routers.

17. The system of claim 1, further comprising:
   a site administrator to provide current values for the dynamic distribution parameters to the first set of routers and the second set of routers.

18. The system of claim 1, wherein at least one of the first set of routers or the second set of routers is configured to:
   receive a new routing scheme,
   receive a first command, prepare the new routing scheme for activation based on the first command, receive a second command, and activate the new routing scheme based on the second command.

19. The system of claim 18, wherein, after activating the new routing scheme, the new routing scheme becomes an activated routing scheme and a previous routing scheme becomes a deactivated routing scheme, the at least one of the first set of routers or the second set of routers is configured to maintain both the activated routing scheme and the deactivated routing scheme.

20. A method for call routing in a system that includes a first set of routers and a second set of routers, comprising:

receiving a call by one of the first set of routers, the call being generated by a client application;

wherein, the first set of routers and the second set of routers implement a routing scheme, the routing scheme being parameterized using dynamic distribution parameters, the dynamic distribution parameters including dynamically determined information, making, by the one first set of routers, a first routing decision for the call based on a weighted random probability function, to select one of the second set of routers to route the call to;

wherein, the weighted random probability function is determined using dynamically determined information of the second set of routers specified in the dynamically determined information, making, by the selected one of the second set of routers, a second routing decision for the call based on the routing scheme; and routing the call based on the first and second routing decisions.

21. A call routing system to route a VoIP call to a termination that provides VoIP-related applications, comprising:

a first set of routers comprising load balancers;

a second set of routers comprising call distributors;

when in operation, a first router of the first set of routers:

receives the VoIP call generated by a client application;

identifies, in a DNS service query, a requested application associated with the call;

identifies an active routing scheme, the routing scheme being parameterized using dynamic distribution parameters, the dynamic distribution parameters specifying dynamically determined capacity information of the second set of routers, determines a first routing decision regarding the VoIP call using a weighted random probability function;

wherein, the first routing decision comprises an identification of a second router of the second set of routers that is in communication with one or more terminations operable to run the requested application;

determining a weight for the weighted random probability function based on the dynamically determined capacity information of the second set of routers;

wherein the probability of the second router of the second set of routers being identified by the weighted random probability function varies based on capacity of the second router as indicated in the dynamically determined capacity information;

wherein, when in operation, the second router determines a second routing decision regarding the VoIP call based on the active routing scheme;

wherein, the second routing decision comprises a selection of the termination of the one or more terminations to process the VoIP call, the termination being a voice XML application.

* * * * *